(No Model.) 3 Sheets—Sheet 1.
D. C. JACKSON & C. M. CONRADSON.
ELECTRIC MOTOR.
No. 552,961. Patented Jan. 14, 1896.
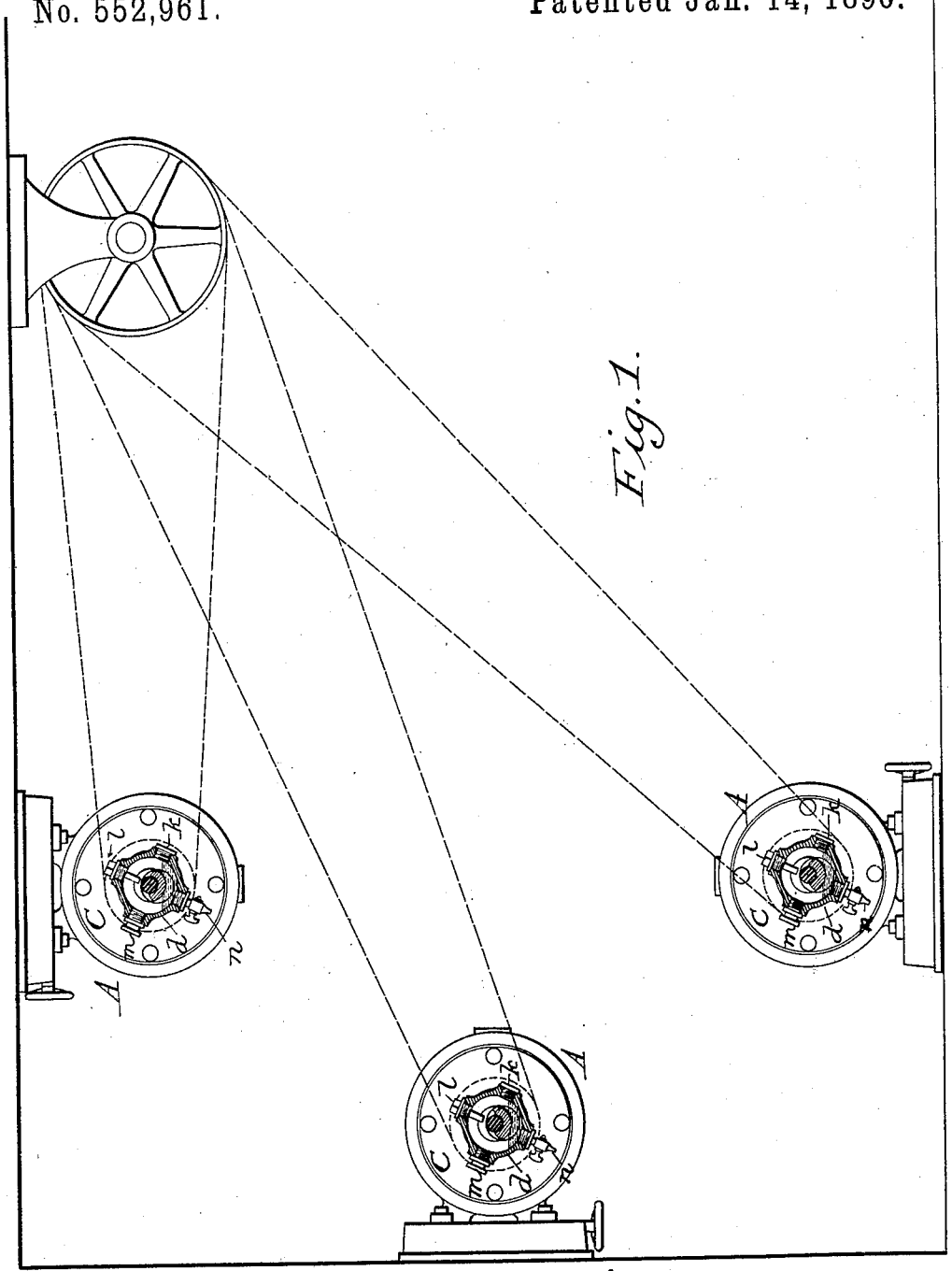

(No Model.) 3 Sheets—Sheet 2.
D. C. JACKSON & C. M. CONRADSON.
ELECTRIC MOTOR.
No. 552,961. Patented Jan. 14, 1896.
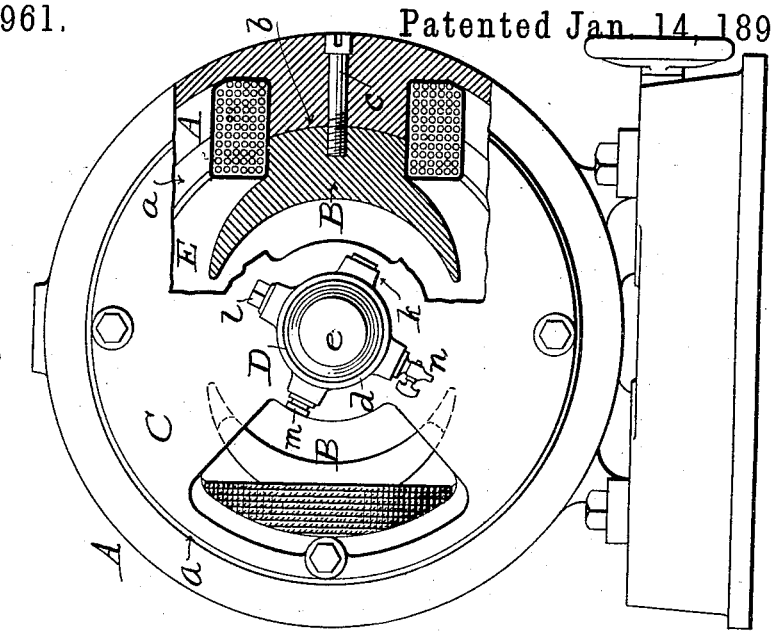
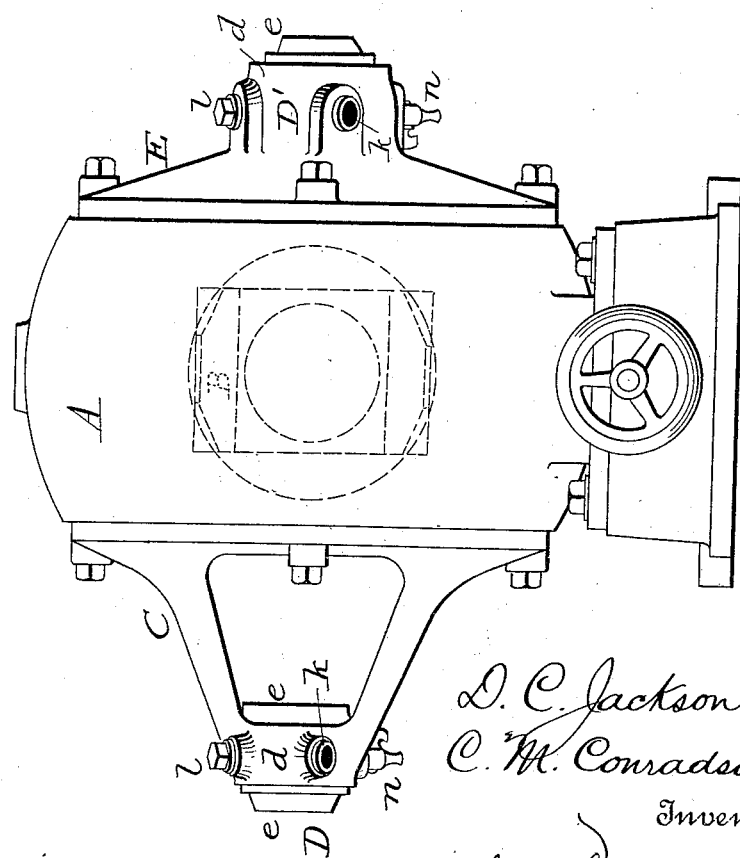
Witnesses
Cle Burdine.
C. B. Bull.
D. C. Jackson
C. M. Conradson
Inventors
by Dodge Sons,
Attorneys (No Model.) 3 Sheets—Sheet 3.
D. C. JACKSON & C. M. CONRADSON.
ELECTRIC MOTOR.
No. 552,961. Patented Jan. 14, 1896.
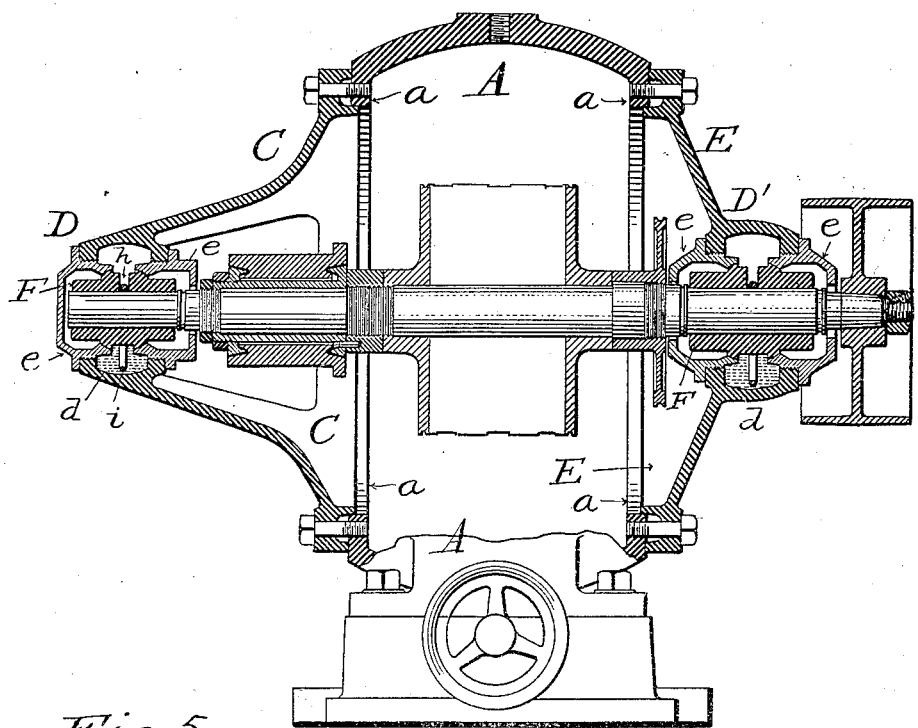
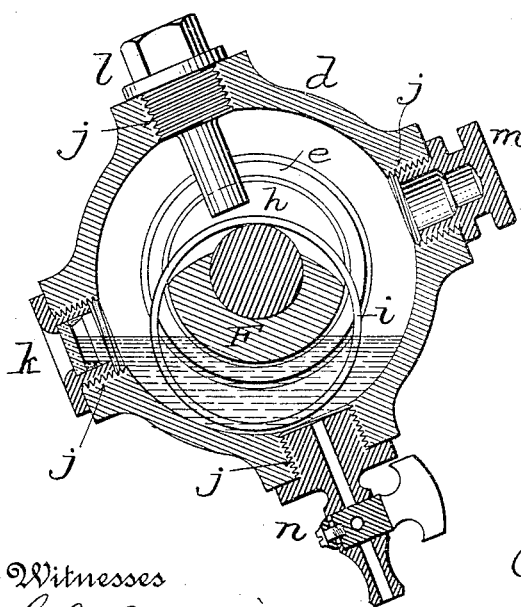
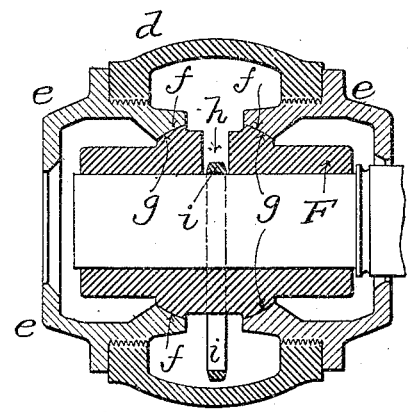
Witnesses
C. C. Burdine
C. B. Bull
D. C. Jackson
C. M. Conradson, Inventors
by Dodge & Sons
Attorneys

UNITED STATES PATENT OFFICE.

DUGALD C. JACKSON AND CONRAD M. CONRADSON, OF MADISON, WISCONSIN.

ELECTRIC MOTOR.

SPECIFICATION forming part of Letters Patent No. 552,961, dated January 14, 1896.

Application filed July 26, 1895. Serial No. 557,185. (No model.)

*To all whom it may concern:*

Be it known that we, DUGALD C. JACKSON and CONRAD M. CONRADSON, citizens of the United States, residing at Madison, in the county of Dane and State of Wisconsin, have invented certain new and useful Improvements in Electric Motors, of which the following is a specification.

Our invention relates to electric motors; and it consists in various novel features of construction hereinafter fully set forth and claimed, whereby the manufacture of the motor is facilitated, an exceedingly strong and compact motor produced, and the motor rendered capable of use in any desired position.

In the drawings, Figure 1 is a diagrammatic view showing the motor in three different positions; Fig. 2, an end elevation of the motor with the armature and connections removed; Fig. 3, a front face view of the same, partly in section; Fig. 4, a vertical sectional view taken on the line of the armature-shaft; and Figs. 5 and 6, sectional views, on a larger scale, of the bearings for the shaft.

A indicates a hollow shell which has the general form of a spherical segment or truncated sphere (with parallel bases) with the flanges $a$ $a$ at its edges, as shown in Figs. 3 and 4, the said flanges extending inwardly a short distance at right angles to the axis of the shell, leaving large openings in the ends of the shell through which insertion of the armature, pole-pieces, &c., is permitted, besides reducing the weight materially. These flanges $a$ $a$ extending circumferentially in the plane in which the sphere is cut stiffen and strengthen the field and permit the use of a lighter shell.

On the inner face of the shell A, between the flanges $a$ $a$, are two heavy lugs or projections $b$ $b$, which extend inward radially, so that they may have their ends bored and turned concentrically with and to the same diameter as the flanges and at the same operation. These projections $b$ $b$ after having their ends turned off are designed to receive the pole-pieces B, which latter are held firmly to the curved seats in the projections $b$ $b$ by means of the screw or screws $c$ $c$, thereby producing a good magnetic joint. Both pole-pieces B B are bored and turned simultaneously while held to their seats, thus insuring their concentricity with the field.

To one end or flat face of the shell A is bolted a bonnet C, carrying a bearing D for one end of the armature-shaft, while to the opposite end of the shell there is secured a second bonnet E, carrying a bearing D' for the corresponding end of the shaft. As the bearings D D' are similar in all respects, a description of only one will be given. Bonnets C and E are provided each with a hub or enlargement $d$ having threaded openings at each end to receive the threaded collars $e$ $e$, Figs. 4, 5, and 6, the said collars, which are independent of each other, being provided at their inner ends with curved circular faces $f$ $f$, which bear upon similarly-curved flanges $g$ $g$ formed on the bearing-sleeve F that receives the armature-shaft. These threaded collars $e$ $e$ serve not only to prevent endwise movement of the sleeve F, but also permit it to tip or rock slightly on the curved faces $f$ $g$ to insure alignment of the sleeves at opposite ends of the shaft. After the sleeves have been aligned the collars are screwed up tight and hold the sleeves against movement in any direction.

The sleeve F is cut away on its upper face, as at $h$, to expose the shaft (see Figs. 5 and 6) and to receive a ring $i$, which, seated in the groove or cut-away part, hangs from the shaft and depends into the oil contained within the hub $d$, the arrangement being such that the rotation of the shaft causes a rotation of the ring and the constant supplying of oil to the shaft. In order to supply oil to the hub, to ascertain the amount of oil in the hub, to draw off the sediment, &c., and to prevent the ring from rising out of its seat or groove, we bore or tap into the hub $d$ four equally-spaced and similarly-threaded holes $j$, designed to receive respectively plugs $k$, $l$, and $m$, and a plug or draw-off cock $n$, as shown in Fig. 5, which shows the parts in the position they would occupy when the motor is secured to the floor, as in Figs. 1, 2, 3, and 4. When, however, the motor is secured to the wall, as in Fig. 1, these plugs will be removed and put into holes ninety degrees in advance of the holes previously occupied. In other words, the plug or cock $n$ will occupy the hole formerly occupied by the sight-plug $k$, while the sight-plug will occupy the hole formerly occupied by the pin-plug $l$, and so on. When the motor is applied overhead, the plugs will be moved one hundred and eighty degrees instead of ninety degrees, as just described.

Of course in putting the motor in its different positions the bearing-sleeves F must be turned or adjusted to bring the groove $h$ uppermost, so that the ring may rest upon and hang from the shaft and dip into the oil.

Having thus described our invention, what we claim is—

1. In combination with a hub having threaded openings at each end; a bearing sleeve provided with circumferential curved flanges $g\ g$; and the threaded collars screwing into the hub and having curved faces $f\ f$ to engage the flanges.

2. In combination with a hub carrying a bearing, and provided with a series of holes; a series of removable and interchangeable plugs fitted to said holes.

3. In combination with a hub carrying a grooved bearing sleeve, and provided with a series of holes; means for rotarily adjusting the sleeve; and removable and interchangeable plugs fitted to said holes.

4. In combination with a hub carrying a bearing and provided with a series of holes; a sight plug; a draw-off plug, and the auxiliary plugs removably and interchangeably fitted to said holes.

In witness whereof we hereunto set our hands in the presence of two witnesses.

DUGALD C. JACKSON.
    CONRAD M. CONRADSON.

Witnesses:
    MINNIE FITZGERALD,
    ROBERT N. McFLYNN.